(12) United States Patent
Ertl et al.

(10) Patent No.: US 11,627,693 B2
(45) Date of Patent: Apr. 18, 2023

(54) HOEING DEVICE

(71) Applicants: Roman Romstorfer, Raggendorf (AT); Philipp Holl, Ottnang am Hausruck (AT); Hannes Hutter, Waidhofen an der Thaya (AT)

(72) Inventors: Philipp Ertl, Peuerbach (AT); Patrick Wagner, Peuerbach (AT); Roman Romstorfer, Raggendorf (AT); Klemens Ollmaier, Pram (AT)

(73) Assignees: Roman Romstorfer, Raggendorf (AT); Philipp Holl, Ottnang am Hausruck (AT); Hannes Hutter, Waidhofen an der Thaya (AT)

( * ) Notice: Subject to any disclaimer, the term of this patent is extended or adjusted under 35 U.S.C. 154(b) by 365 days.

(21) Appl. No.: 16/965,679

(22) PCT Filed: Jan. 10, 2019

(86) PCT No.: PCT/AT2019/060009
§ 371 (c)(1),
(2) Date: Jul. 29, 2020

(87) PCT Pub. No.: WO2019/148220
PCT Pub. Date: Aug. 8, 2019

(65) Prior Publication Data
US 2021/0037690 A1   Feb. 11, 2021

(30) Foreign Application Priority Data
Feb. 1, 2018 (AT) .............................. A 50099/2018

(51) Int. Cl.
*A01B 35/32* (2006.01)
*A01B 39/18* (2006.01)
(Continued)

(52) U.S. Cl.
CPC .............. *A01B 35/32* (2013.01); *A01B 39/18* (2013.01); *A01B 39/26* (2013.01); *A01B 73/044* (2013.01); *A01B 79/005* (2013.01)

(58) Field of Classification Search
CPC ......... A01B 35/32; A01B 39/18; A01B 39/26; A01B 73/044; A01B 79/005
See application file for complete search history.

(56) References Cited

U.S. PATENT DOCUMENTS

| 4,905,770 A | 3/1990 | Hanig |
| 5,103,917 A | 4/1992 | Moore |
| 2009/0032274 A1 | 2/2009 | Pitonyak |

FOREIGN PATENT DOCUMENTS

| CN | 203457509 U | 3/2014 |
| DE | 849618 C | 9/1952 |

(Continued)

OTHER PUBLICATIONS

International Search Report for PCT/AT2019/060009, dated Apr. 4, 2019 (14 pages).

(Continued)

*Primary Examiner* — Tara Mayo
(74) *Attorney, Agent, or Firm* — Eversheds Sutherland (US) LLP

(57) ABSTRACT

The invention relates to an adjustable hoeing device (10) for removing weeds situated on a ground surface, the hoeing device (10) having a supporting frame (50), on which there is arranged at least one hoeing unit (100), which hoeing unit comprises the following:—at least one main bar (200) and at least two transverse bars (250) arranged parallel to one another, which transverse bars (250) are each mounted rotatably on the at least one main bar (200);—at least two connection bars (300), which run parallel to the at least one main bar (200) and which mechanically connect the at least two transverse bars (250) to one another;—at least two (Continued)

Figure 1:
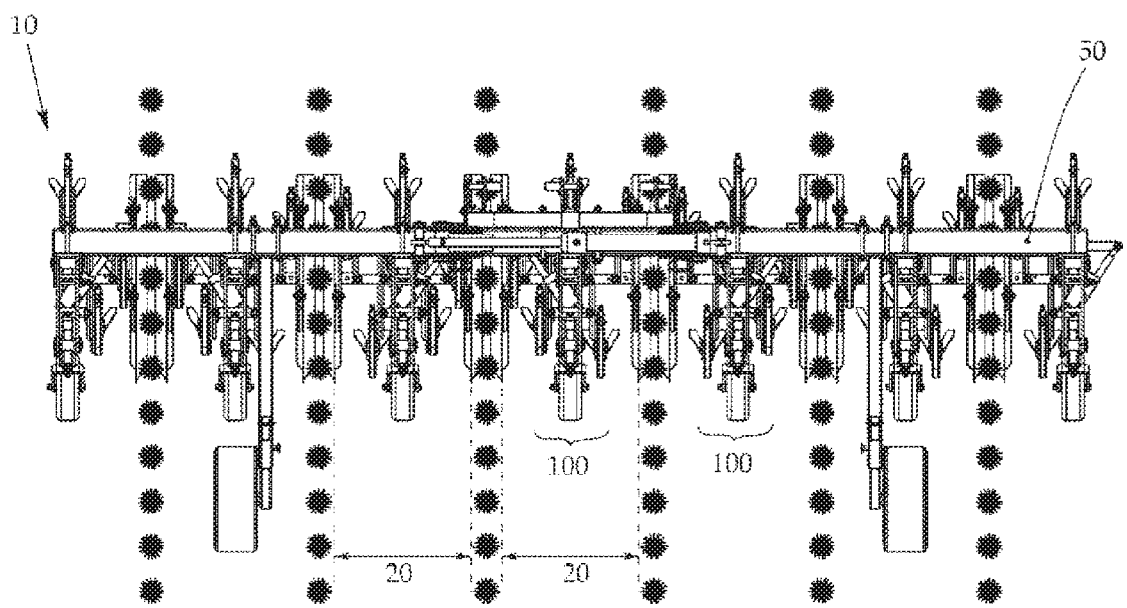

blades (500), wherein the blades (500) are arranged on the at least two transverse bars (250) at a normal distance from the main bar (200); and—at least one actuation device (400), which acts on at least two transverse bars (250) or a transverse bar (250) and the main bar (200) in order to rotate same by means of a linearly displaceable actuation arm.

12 Claims, 5 Drawing Sheets

(51) Int. Cl.
 *A01B 79/00* (2006.01)
 *A01B 39/26* (2006.01)
 *A01B 73/04* (2006.01)

(56) References Cited

FOREIGN PATENT DOCUMENTS

| | | |
|---|---|---|
| DE | 1757919 A1 | 6/1971 |
| FR | 2359570 A1 | 2/1978 |
| FR | 2923980 A1 | 5/2009 |
| GB | 1082145 A | 9/1967 |

OTHER PUBLICATIONS

Office Action for Austrian Patent Application No. A 50099/2018, dated Aug. 31, 2018 (4 page).

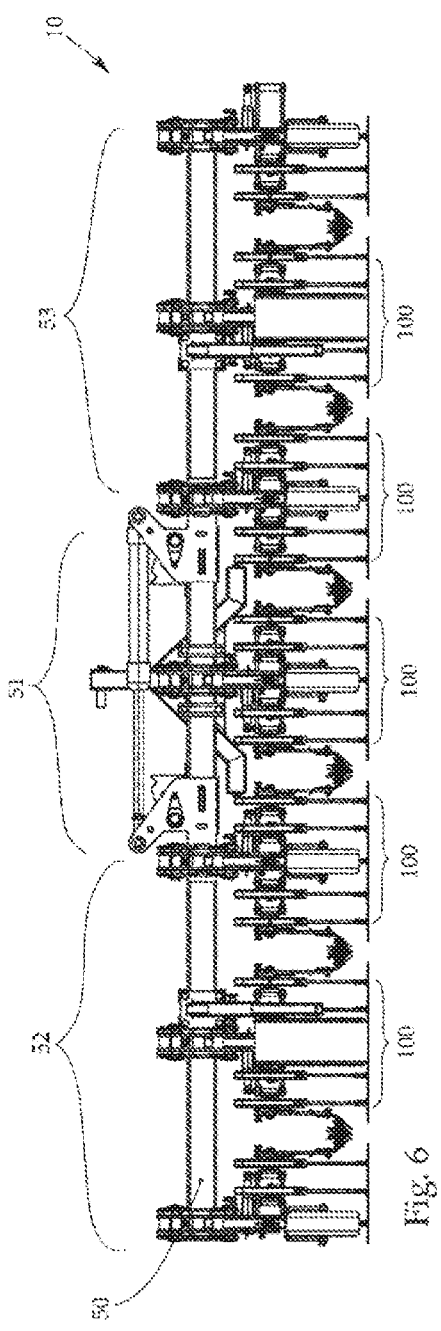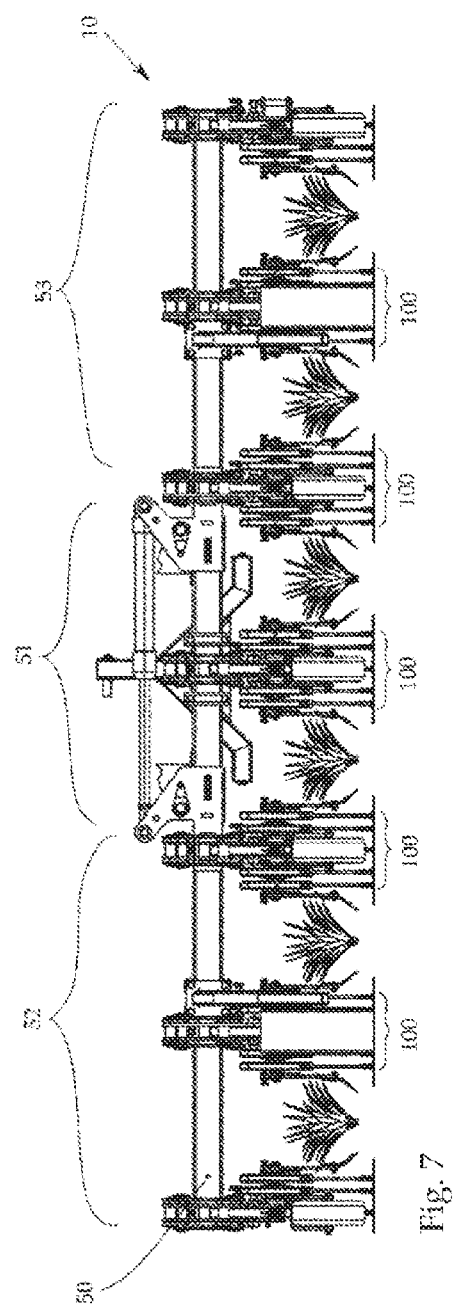

HOEING DEVICE

The invention concerns an adjustable hoeing device for removing weeds on the ground between rows of agricultural crops, which are positioned in spaced rows on the ground, with the hoeing device having a supporting frame, which is designed to be attached to an agricultural vehicle and on which at least one hoeing unit with a processing width that can be adjusted to fit the row spacing is disposed.

Hoeing devices usually remove the unwanted plants and/or weeds from the rows of row crops in the field, for example pumpkins, corn or carrots, as well as trees or bushes, where the individual rows are disposed at a certain distance—also called the row distance.

Without hoeing and/or removal of the unwanted plants, the actual crop would be overgrown with weeds and/or unwanted plants and/or its growth would be very strongly impaired, as a result of which the crop yield decreases substantially.

In doing so, the processing width of the hoeing devices and/or the hoeing units is set to a fixed value and can currently only be adjusted manually with great difficulty and a considerable loss of time.

Users therefore frequently do not perform such an adjustment of the processing width on the hoeing device and, with a constant processing width set on the hoeing device, different row crops and/or arable crops are not grown on the same land. The growth of the plants during a season is therefore not taken into account.

The object of this invention is to make available an improved hoeing device, which allows for a simpler adjustment of the processing width of a hoeing unit.

This task is accomplished in that the hoeing device has at least a hoeing unit, which comprises the following:

at least one straight main bar and at least two transverse bars, which transverse bars are respectively mounted so as to be rotatable about an axis of rotation of the at least one main bar, with the axes of rotation positioned in parallel along the longitudinal extent of the main bar and in one plane, and with at least two transverse bars respectively positioned in parallel to each other, at least one connecting bar extending parallel to the at least one main bar, which mechanically connects at least two transverse bars with one another, so that rotating motions of the transverse bars are coupled to each other, at least two blades for removing weeds present in the soil, which blades are disposed, at a normal distance from the main bar, with a definable orientation with respect to the at least two transverse bars, with the orientation of the blades remaining unchanged upon a rotation of the corresponding transverse bars, and at least one actuation device with a drive unit for turning at least one transverse bar, with a turn of the transverse bars altering the normal distance of the blades from the main bar, and with the normal distance of the respective blades being continuously adjustable between a maximum and a minimum normal distance.

The possibility of adjusting the processing width allows the user to hoe a lot closer to the rows of arable crops and thus reduces the growth of weeds immediately next to the plants. The processing width can furthermore be individually tailored to and/or adjusted for each crop, with repeated adjustments of the processing width during the operation of the hoeing device being possible.

A usual row distance can be between 12.5 cm and 75 cm or more.

There is furthermore the possibility of adjusting the processing width from field to field between different growth stages and/or growth phases or between different arable crops while cultivating the soil.

It should be noted that the blades are disposed on the transverse bars in such a manner that, upon rotation of the transverse bars and/or an adjustment of the processing width of the at least one hoeing unit by means of the actuation device, the orientation of the blades with respect to the longitudinal direction of the main bar is maintained and/or is not altered.

It should furthermore be noted that the position of the blades and associated kinematics are selected in such a manner that, regardless of the set processing width of the hoeing unit, the blades do not lie in any shared plane that is perpendicular or parallel to the longitudinal direction of the main bar so as to achieve the best possible earth flow and to prevent an accumulation of harvested and hoed remains.

Cutting blades and/or so-called finger hoes can for example be used as blades.

It can be provided that all transverse bars are disposed parallel to each other.

It can furthermore be provided that the transverse bars can have different lengths.

It can, for example, be provided that the at least one hoeing unit has three transverse bars, which are disposed parallel to each other, with each transverse bar having a different length than the others.

It can be provided that the drive unit of the actuation device is configured as a linearly adjustable positioning arm.

It can be provided that the at least one actuation device for rotating the transverse bars engages at least two transverse bars.

It can advantageously be provided that the actuation device for turning the transverse bars engages at least one transverse bar and the main bar.

It can furthermore also be provided that the actuation device comprises at least one transmission bar, which is mechanically connected to at least one transverse bar and the positioning arm, in order to turn the transverse bars upon a linear displacement of the positioning arm.

The at least one hoeing unit can advantageously comprise at least one supporting wheel, which supporting wheel is configured to guide the at least one hoeing unit along the ground while the hoeing device is installed on a vehicle, with the distance of the at least one hoeing unit from the ground being adjustable by means of a height adjusting device.

It can be provided that at least one plant protection element is disposed on at least one outer end of at least one transverse bar, with the at least one plant protection element advantageously being disposed so that it is parallel to the main bar in its longitudinal direction.

It can be advantageous for at least one plant protection element to be mounted at the outer ends of at least one transverse bar, with the plant protection elements advantageously being disposed parallel to the main bar in their longitudinal direction.

In one expedient embodiment, the supporting frame can essentially have an oblong extent.

It can be advantageously provided that the supporting frame has a main section and at least two side sections laterally adjoining the main section, which side sections are respectively tied to the main section so as to alternate between a folded-up and an unfolded condition, with at least one hoeing unit being provided for each side section.

In this case, it can be provided that the side sections lie in a folded-up condition along the axis with the main section of the supporting frame and are folded up over the main section starting from a state in which the hoeing device is attached to the vehicle.

In a practical embodiment, the at east one actuation device is configured as a linear motor or as an electrical, hydraulic, pneumatic lifting cylinder or a lifting cylinder operated in a different way.

It can be provided that the at least one actuation device is configured as a rotary motor in the joint.

In another embodiment, it can also be provided that the actuation device is manually adjustable, with the positioning arm for example being fixable in its position by means of a securing bolt or a clamping device.

It can be provided that the at least one plant protection element is configured as a protective sheet, which is ball bearing mounted on the corresponding transverse bars, and/or as a plant protection metal sheet, which is partly passed into the ground during the operation of the hoeing device.

It can furthermore be provided that the orientation of the plant protection elements with respect to the longitudinal direction of the main bar is maintained and/or not altered upon a rotation of the transverse bars and/or an adjustment of the processing width of the at least one hoeing unit.

It can be provided that the hoeing device comprises at least two hoeing units.

It is then provided that the actuation devices of the hoeing units are independently operable by means of a controller, so that the hoeing units can have different processing widths.

It is advantageously possible to provide a controller for operating the actuating device, which controller is disposed in the vehicle to which the hoeing device is attached.

It can be provided that the actuation devices of the hoeing units comprise at least one position feedback unit, for example a potentiometer, with the processing width of the respective hoeing unit being detectable by means of the position feedback unit, which transmits an appropriate signal to the controller so as to monitor and/or readjust the respective preset processing width of a hoeing unit and/or to display it to the user.

To accomplish this, the position feedback unit also, e.g., comprises a camera, which optically records the processing width to be set and transmits an appropriate signal to the control device.

Figure 2:
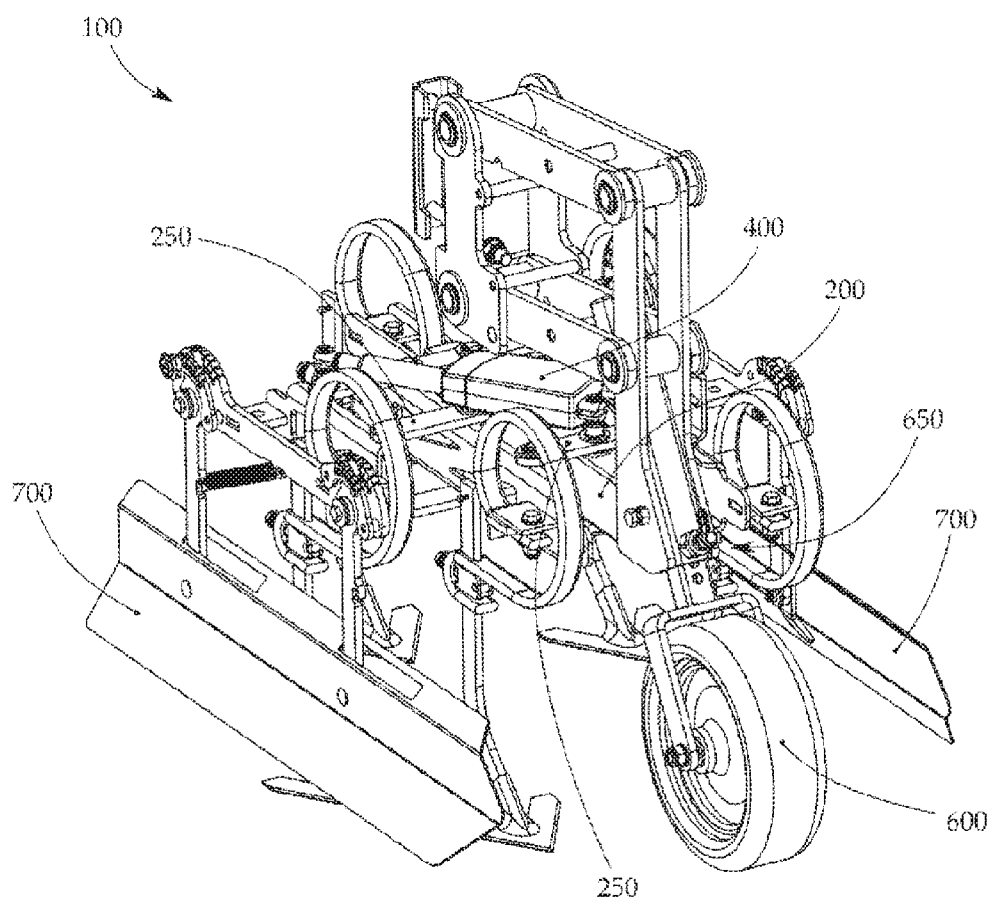
Figure 2A:
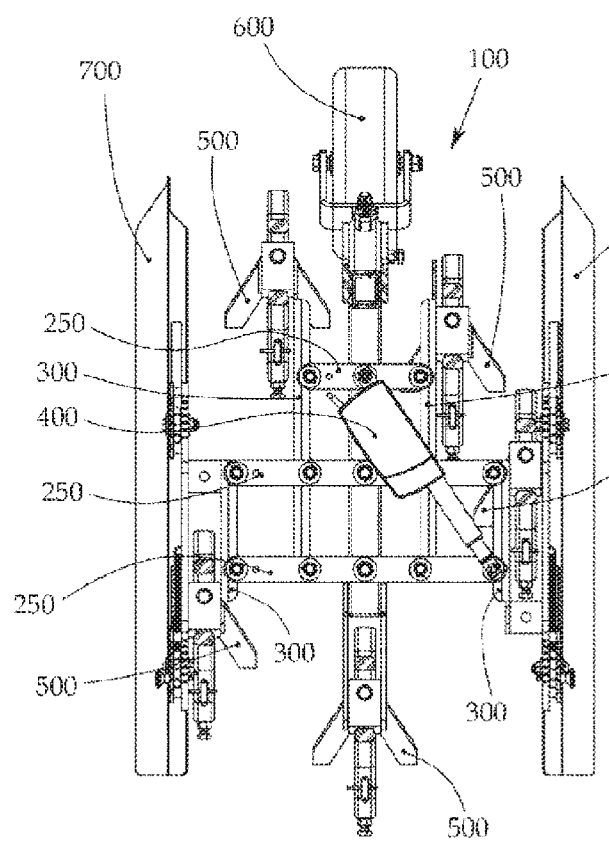
Figure 3A:
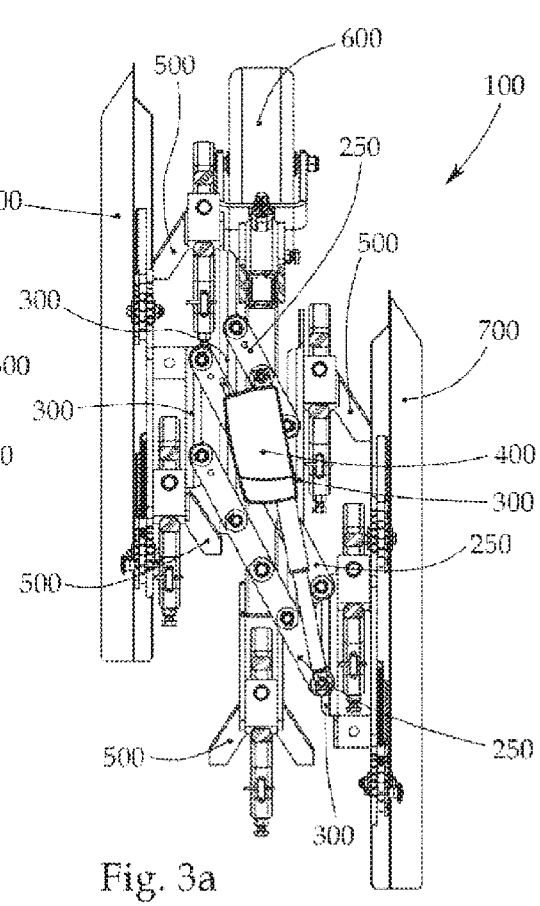
Figure 2B:
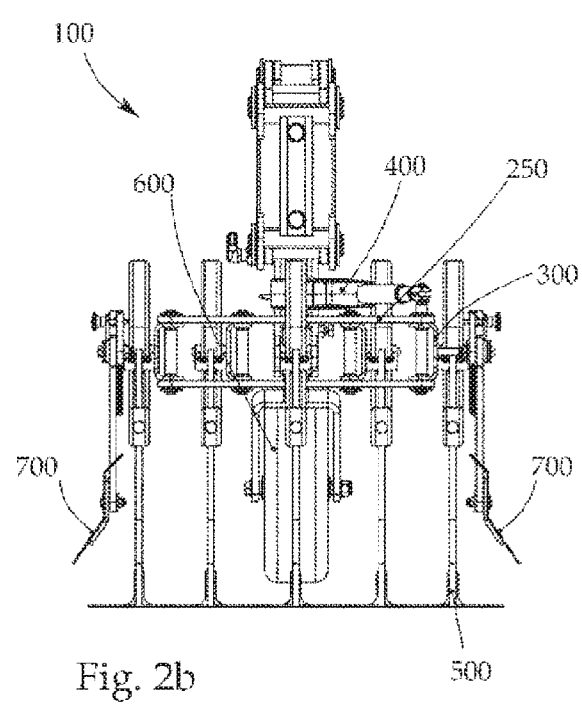
Figure 3B:
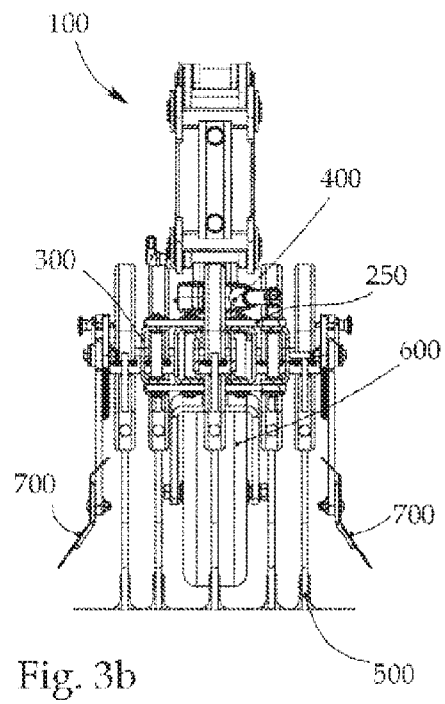
Figure 4:
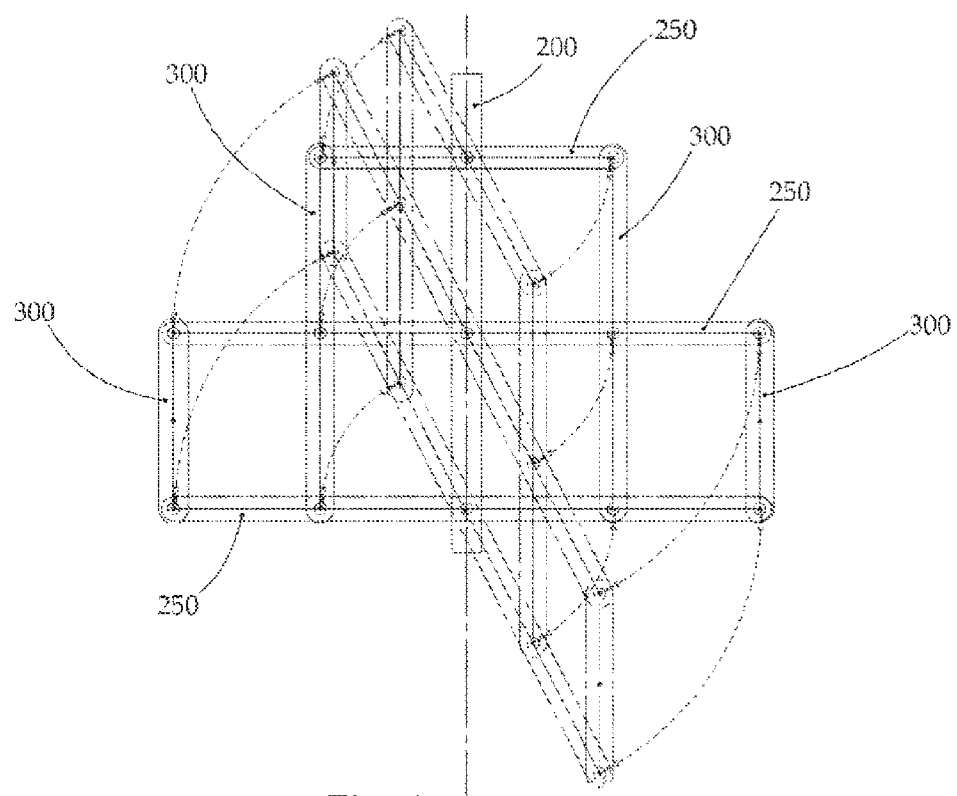
Figure 5:
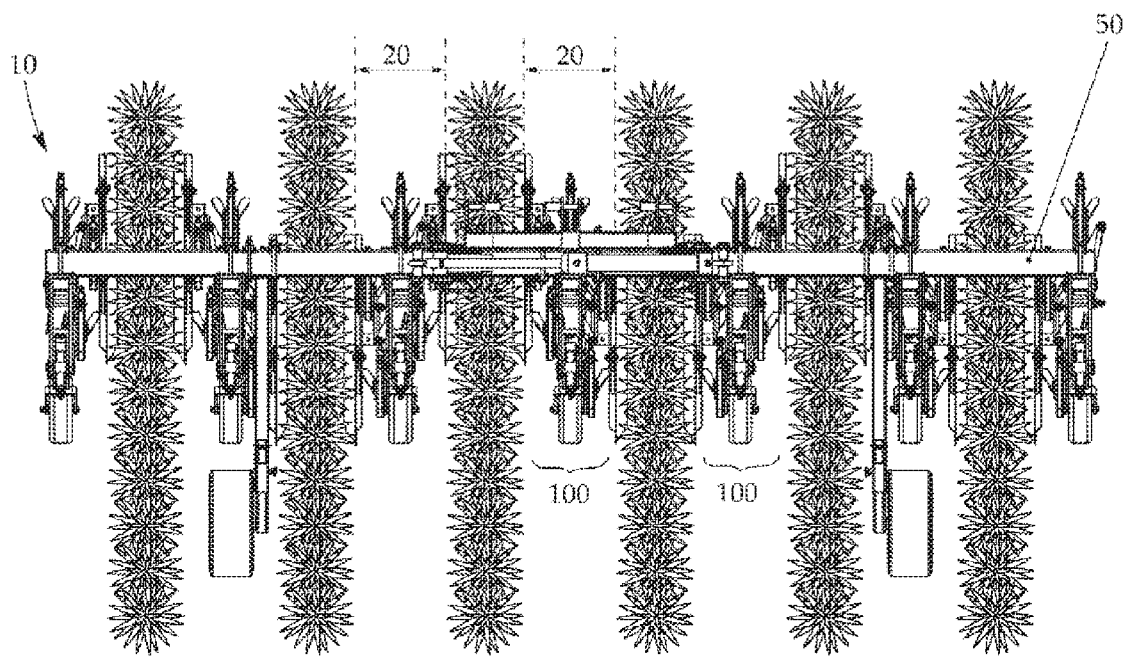

The invention is hereinafter elucidated in greater detail by means of drawings of examples, which show:

FIG. 1 an example of a hoeing device with seven hoeing units disposed on a support frame, with the hoeing device being conveyed on terrain whereon several rows of agricultural crops are planted in rows while a row spacing is maintained, FIG. 2 an example of a hoeing unit of the hoeing device of FIG. 1 in perspective view, where the hoeing unit has a main bar with rotatable transverse bars, FIG. 2a a top view of the hoeing unit of FIG. 2 with the highest possible adjustable processing width, FIG. 2b a layout of the hoeing unit of FIG. 2, FIG. 3a a top view of the hoeing unit of FIG. 1 with lowest possible adjustable processing width, FIG. 3b a layout of the hoeing unit of FIG. 3a, FIG. 4 a sketchy depiction of the possible rotational motion of the transverse bars, FIG. 5 the example hoeing device of FIG. 1, where the processing width of the row crops on the ground is smaller and the processing width set on the hoeing units is adjusted accordingly, FIG. 6 a layout of the example hoeing device of FIG. 1, FIG. 7 a front view of the example hoeing device of FIG. 5, and FIG. 8a, 8b, 8c, 8d other possible example embodiments of a hoeing unit.

FIG. 1 shows an example of an adjustable hoeing device 10 for removing weeds on a ground between rows of agricultural crops planted in rows with a row distance 20 between them, with the hoeing device 10 essentially comprising a supporting frame 50 extending lengthwise, which is designed to be attached to an agricultural vehicle and on which seven hoeing units 100 with an adjustable processing width corresponding to the row distance 20 in this figure are disposed in this example embodiment.

FIG. 2 is an example of a hoeing unit 100 in perspective view, with the hoeing unit 100 having a main bar 200 extending in a straight line and three transverse bars 250 running parallel to each other, which transverse bars 250 are disposed at the main bar 200 to be respectively rotatable about an axis of rotation, with the axes of rotation running in parallel and in one plane along the longitudinal extent of the main bar 200, which is, for example, more clearly evident in FIG. 2a, which shows a top view of a cross section of the hoeing unit 100 of FIG. 2.

Two connecting bars 300 extending parallel to the main bar 200 are furthermore provided, which connecting bars 300 mechanically connect the three transverse bars 250, one of which is shorter than the others, so that the rotational motion of the transverse bars 250 is mutually coupled.

The hoeing unit 100 in the drawings furthermore comprises a supporting wheel 600, which supporting wheel 600 is designed to guide at least the one hoeing unit 100 along the ground when the hoeing device 10 is attached to a vehicle, with the distance of the at least one hoeing unit 100 from the ground being adjustable by means of a height adjusting device 650.

The hoeing unit 100 in the examples shown in the figures furthermore comprises five cutting blades 500 for removing the weeds on the ground, with the cutting blades 500 each disposed in a settable direction on the three transverse bars at a normal distance from the main bar 200.

FIG. 2b shows a layout and/or a rear view—as seen in the driving direction during the operation of the hoeing device—of the example hoeing unit of FIG. 2a, wherein the five cutting blades 500 can be clearly identified.

The term "driving direction" in this context signifies the direction in which a propelled vehicle moves as provided for in its design. A technically possible backup movement is not defined as the driving direction in this context.

As shown in FIG. 2a and/or in FIG. 3a, the orientation of the cutting blades 500 with respect to the longitudinal direction of the main bar 200 is furthermore maintained and/or not altered when the transverse bars 250 are rotated, i.e, in the event of a change in the processing width of the respective hoeing unit 100.

A plant protection element 700 running parallel to the main bar 200 in its longitudinal direction and configured as a plant protection metal plate in the examples shown in the drawings is respectively disposed on the outside ends of the equally long transverse bars 250, with the plant protection metal plate 700 being partly passed into the ground during the operation of the hoeing device.

The orientation of the plant protection elements 700 with respect to the longitudinal direction of the main bar 200 is furthermore maintained and/or is not altered upon a rotation of the transverse bars 250 and/or a change in the processing width of the hoeing unit 100.

It can also be provided that a hoeing unit 100 comprises just one plant protection element, with such hoeing units preferably being disposed at the outside ends of the supporting frame 50, as e.g. shown in FIG. 1.

The hoeing unit 100 furthermore comprises an actuation device 400, which engages at least two transverse bars 250 for purposes of rotating the latter by means of a linearly adjustable positioning arm, with a rotation of the transverse bars 250 changing the normal distance of the respective cutting blades 500 from the main bar 200, and with the normal distance of the respective cutting blades 500 being continuously adjustable between a maximum and a minimum normal distance.

In the examples shown in FIG. 1, 2, 2a, 2b, 3a, 3b, one end of the actuation device 400 engages an end of a transverse bar 250 and the main bar 200 in order to rotate the transverse bars 250 by means of the linearly adjustable positioning arm.

The actuation device 400 is, for example, configured as an electrical lifting cylinder, but it can also be a linear motor, with a controller being provided for controlling the actuation device 400, which controller is advantageously located in the vehicle to which the hoeing device 10 is attached.

The actuation device 400 can furthermore also be propelled hydraulically or pneumatically.

In another embodiment, it can be also be provided that the actuation device 400 is manually adjustable, with the actuating arm for example being fixable in its position by means of a safety bolt or a clamping device.

FIG. 2a and FIG. 2b show the maximum normal distance of the cutting blades 500 from the main bar 200 and/or the maximum adjustable processing width of the hoeing unit 100, with the maximum normal distance being obtained by means of transverse bars 250 that run orthogonal to the main bar 200 as shown in the drawings.

FIG. 3a and FIG. 3b show the minimum adjustable normal distance of the cutting blades 500 from the main bar 200 and/or the minimum possible processing width of the hoeing unit 100.

FIG. 4 shows a schematic drawing of the mechanical coupling of the transverse bars 250 with the main bar 200 from the previous figures.

FIG. 5 shows the example hoeing device 10 of FIG. 1, with the row distance 20 between the shown rows of arable crops being smaller and the processing width of the hoeing units 100 being adjusted accordingly by means of the respective actuation device 400.

It is however also possible for the actuation devices 400 of the hoeing units 100 to be independently controllable, so that the hoeing units 100 can have different processing widths.

FIGS. 6 and 7 respectively show a layout of an example hoeing device 100 with different processing widths, with the supporting frame 50 having a main section 51 and two side sections 52, 53 adjacent to the main section 51, which are respectively articulately jointed to the main section 51 so as to alternate between an unfolded and a folded condition, with three hoeing units 100 being allocated for each side section 52, 53 and one hoeing unit 100 for the main section 51.

However, the aforesaid number of hoeing units 100 for each section 51, 52, 53 is just an example and can be freely chosen in principle.

The side sections 52, 53 are furthermore unfolded along the axis of the main section 51 of the supporting frame 50 and are folded up over the main section 51 starting from a condition in which the hoeing device 10 is attached to the vehicle.

It can be also provided that, if the side sections 52, 53 are of greater width, they are folded up to the rear—starting from a state in which the hoeing device 10 is attached to the vehicle.

Figure 8A:
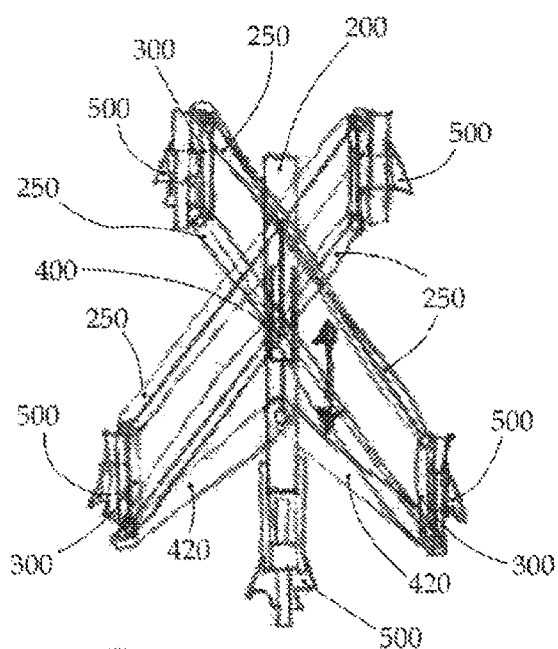

FIG. 8a shows another possible example embodiment of a hoeing unit 100, where the actuation device 400 additionally comprises two transmission bars 420, each of which is mechanically connected to a transverse bar 250 and the positioning arm, so as to turn the transverse bars upon a linear displacement of the positioning arm.

Figure 8B:
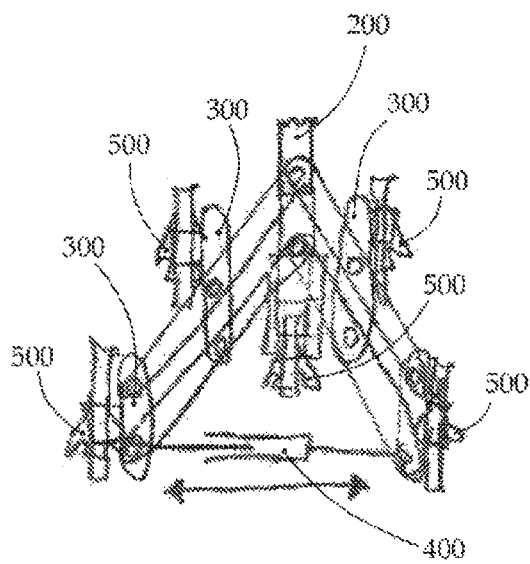
Figure 8C:
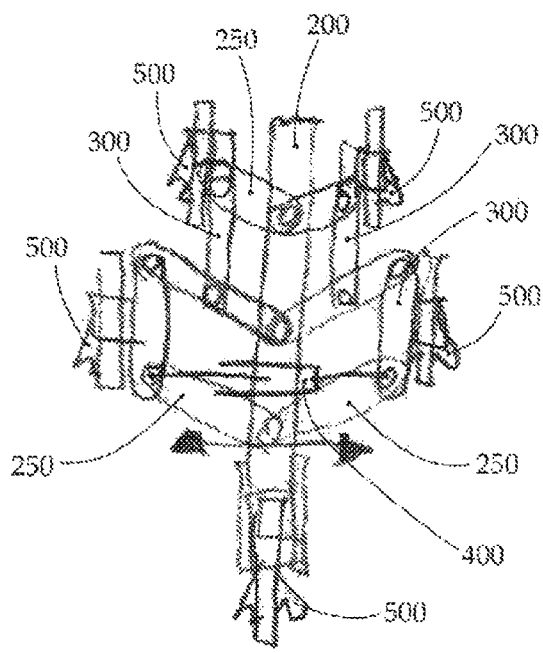

FIGS. 8b and 8c show another example of a hoeing unit 100 where the actuation device 400 engages two transverse bars 250 for purposes of turning the transverse bars 250.

Figure 8D:
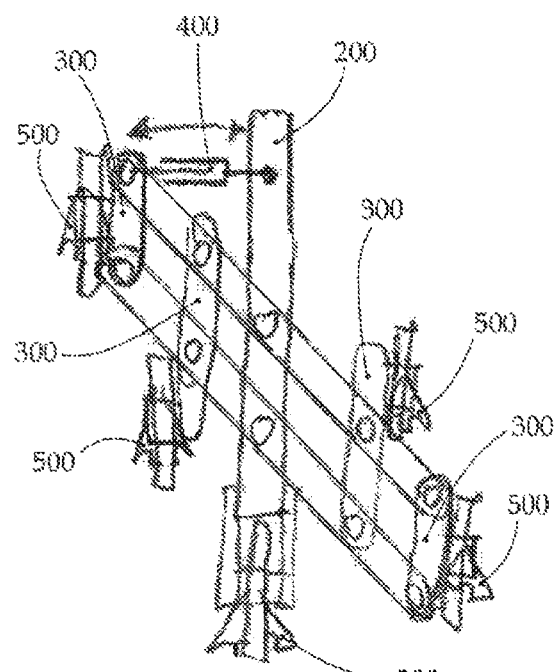

FIG. 8d shows another example of a hoeing unit 100 where the actuation device engages a transverse bar and the main bar 200 for purposes of rotating the transverse bars 250.

It is noted that the examples shown in the figures do not show any exclusive example embodiments.

| LIST OF REFERENCE SYMBOLS | |
| --- | --- |
| Hoeing device | 10 |
| Row distance | 20 |
| Supporting frame | 50 |
| Main section | 51 |
| Side sections | 52, 53 |
| Hoeing unit | 100 |
| Main bar | 200 |
| Transverse bars | 250 |
| Connecting bar | 300 |
| Actuation device | 400 |
| Transmission bar | 420 |
| Blade | 500 |
| Supporting wheel | 600 |
| Height adjusting device | 650 |
| Plant protection element | 700 |

The invention claimed is:

1. An adjustable hoeing device (10) for removing weeds that are present on the ground between rows of agricultural crops, which are set out on the ground in a spaced manner with a row distance (20) from each other, with the hoeing device (10) comprising a supporting frame (50), which is designed to be attached to an agricultural vehicle and on which at least one hoeing unit (100) with a processing width that is settable to the row distance (20) is disposed, with the hoeing unit (100) comprising the following:

at least one main bar (200) extending in a straight line and at least two transverse bars (250), which transverse bars (250) are respectively mounted on at least one main bar (200) so that they are rotatable about an axis of rotation, with the axes of rotation disposed in parallel along the longitudinal extent of the main bar (200) and in one plane, and with at least two transverse bars (250) being disposed in parallel to each other, at least one connecting bar (300) extending parallel to the at least one main bar (200), which connecting bar (300) mechanically connects the at least two transverse bars (250) with each another so that rotational motions of the transverse bars (250) are coupled to each other, at least two blades (500) for removing weeds present on the ground, which blades (500) are disposed at the at least two transverse bars (250) at a normal distance from the main bar (200) and in a definable orientation with respect to the main bar (200), with the orientation of the blades (500) remaining unaltered upon rotation of the corresponding transverse bars (250), and at least one actuation device (400) with a drive unit for rotating at least one transverse bar, with a rotation of the transverse bars (250) altering the normal distance of the blades (500) from the main bar (200), and with the normal distance of the respective blades (500) being continuously adjustable between a maximum and a minimum normal distance, wherein the hoeing device (10) comprises at least two hoeing units (100), wherein the actuation devices (400) of the hoeing units (100) are independently controllable by a controller, so that the hoeing units (100) can have different processing widths, wherein the actuation devices (400) of the hoeing units (100) comprise at least one position feedback unit comprising a potentiometer, whereby the processing width of the respective hoeing unit (100) can be determined by the position feedback unit, which transmits an appropriate signal to the controller so as to monitor the respectively set processing width of a hoeing unit (100), to readjust it and/or to display it to the user, and wherein the position feedback unit comprises a camera, which optically records the processing width to be set and transmits an appropriate signal to the control device.

2. The device according to claim 1, wherein the drive unit of the actuation device (400) is configured as a linearly adjustable positioning arm.

3. The device according to claim 2, wherein the actuation device (400) furthermore comprises at least one transmission bar (420), which at least one transmission bar (420) is mechanically connected to at least one transverse bar (250) and the positioning arm in order to rotate the transverse bars (250) upon a linear displacement of the positioning arm.

4. The device according to claim 1, wherein the at least one actuation device (400) engages at least two transverse bars (250) for purposes of rotating the transverse bars (250).

5. The device according to claim 1, wherein the actuation device (400) engages at least one transverse bar (250) and the main bar (200) for purposes of rotating the transverse bars (250).

6. The device according to claim 1, wherein the at least one hoeing unit (100) comprises at least one supporting wheel (600), which supporting wheel (600) is configured to run the at least one hoeing unit (100) along the ground when the hoeing device (10) is attached to a vehicle, with the distance of the at least one hoeing unit (100) from the ground being adjustable by a height adjusting device (650).

7. The device according to claim 1, wherein at least one plant protection element (700) is provided on at least one outer end of at least one transverse bar (250), with the longitudinal direction of the at least one plant protection element (700) being parallel to the main bar (200).

8. The device according to claim 1, wherein at least one plant protection element (700) is disposed at the outer ends of at least one transverse bar, with the longitudinal direction of the plant protection elements (700) being parallel to the main bar (200).

9. The device according to claim 1, wherein the supporting frame (50) has a main section (51) and two side sections (52, 53) that are laterally adjacent to the main section (51), which side sections (52, 53) are respectively articulately connected to the main section (51) so as to switch between an unfolded and a folded-up state, with at least one hoeing unit (100) provided for each side section (52, 53).

10. The device according to claim 9, wherein the side sections (52, 53) are in an unfolded state along the same axis as the main section (51) of the supporting frame (50) and are folded up over the main section (51) starting from a state in which the hoeing device (10) is attached to a vehicle.

11. The device according to claim 1, wherein the at least one actuation device (400) is a linear motor or an electrical, hydraulic or pneumatic lifting cylinder.

12. The device according to claim 1, wherein a controller is used to operate the actuation device (400), which controller is located in the vehicle to which the hoeing device (10) is attached.

* * * * *